United States Patent
Subires Bedoya

(10) Patent No.: US 9,558,362 B2
(45) Date of Patent: Jan. 31, 2017

(54) DATA ENCRYPTION USING AN EXTERNAL ARGUMENTS ENCRYPTION ALGORITHM

(76) Inventor: Antonio Subires Bedoya, Malaga (ES)

(*) Notice: Subject to any disclaimer, the term of this patent is extended or adjusted under 35 U.S.C. 154(b) by 70 days.

(21) Appl. No.: 14/363,745

(22) PCT Filed: Jan. 23, 2012

(86) PCT No.: PCT/ES2012/070032
§ 371 (c)(1),
(2), (4) Date: Jul. 29, 2014

(87) PCT Pub. No.: WO2013/110826
PCT Pub. Date: Aug. 1, 2013

(65) Prior Publication Data
US 2015/0205970 A1 Jul. 23, 2015

(51) Int. Cl.
| | | |
|---|---|---|
| *G06F 21/62* | (2013.01) | |
| *H04L 9/14* | (2006.01) | |
| *H04L 9/08* | (2006.01) | |
| *G06F 21/60* | (2013.01) | |

(52) U.S. Cl.
CPC .............. *G06F 21/62* (2013.01); *G06F 21/602* (2013.01); *G06F 21/6218* (2013.01); *H04L 9/0894* (2013.01); *H04L 9/14* (2013.01); *G06F 2221/2115* (2013.01); *G06F 2221/2135* (2013.01); *G06F 2221/2137* (2013.01)

(58) Field of Classification Search
CPC ........... G06F 21/62; H04L 9/0894; H04L 9/14
See application file for complete search history.

(56) References Cited

U.S. PATENT DOCUMENTS

| | | | | |
|---|---|---|---|---|
| 2001/0056541 A1* | 12/2001 | Matsuzaki | .......... | G06F 21/6218 713/193 |
| 2005/0154795 A1* | 7/2005 | Kuz | .................... | H04L 63/0428 709/227 |
| 2006/0126850 A1* | 6/2006 | Dawson | .............. | H04L 63/0428 380/284 |
| 2009/0138699 A1 | 5/2009 | Miyazaki et al. | | |
| 2013/0041831 A1* | 2/2013 | Das | ........................ | G06Q 20/20 705/72 |

OTHER PUBLICATIONS

International Search Report, Oct. 1, 2012, from International Phase of the instant application.
English Translation of International Preliminary Report on Patentability Chapter I, Jul. 29, 2014, from International Phase of the instant application.
English Translation of the Written Opinion of the International Search Authority, Jul. 23, 2014, from International Phase of the instant application.

* cited by examiner

*Primary Examiner* — William Goodchild
(74) *Attorney, Agent, or Firm* — AEON Law; Jonathan Olson; Adam Philipp

(57) ABSTRACT

Data encryption using an external arguments encryption algorithm: it is an encryption system which uses symmetrical secret key algorithms but the operating arguments thereof and/or the actual encryption/decryption algorithm is/are unknown before use and is/are created at the time of encryption and then destroyed but is/are stored in an independent or non-independent computer or non-computer system (paper, human memory, other non-computer media, etc.) of the system which encrypts or decrypts the data/message for the subsequent reuse thereof at the time of decryption. It will be used as a client/server system, wherein the client uses a set of variable arguments and/or the actual algorithm which is/are stored, however, outside the actual client in the server. The operating arguments and/or the actual encryption/decryption algorithm may be generated/used both by the client and by the server but is/are stored exclusively in the server (whether this is a computer or non-computer storage system) in a manner independent of the client, which makes it possible to control and/or limit the use thereof.

23 Claims, No Drawings

DATA ENCRYPTION USING AN EXTERNAL ARGUMENTS ENCRYPTION ALGORITHM

FIELD OF TECHNOLOGY

The invention lies in the field of computers, specifically, data security by means of encryption/encoding of data: cryptology.

PRIOR ART

The principal two systems used for data encryption at present are:

a. Encryption with a secret key symmetrical algorithm (examples: DES, 3DES, RC5, AES, Blowfish, IDEA, etc.); this is a cryptography method in which one uses the same key to encode and decode messages. The two parties communicating have to agree beforehand as to the key to be used. Once both have access to this key, the sender encodes a message using it, sends it to the recipient, and the latter decodes it with the same key.

b. Asymmetrical cryptography is the cryptographic method which uses a pair of keys for the sending of messages. The two keys belong to the same person who has sent the message. One key is public and can be delivered to any person, the other key is private and the owner must keep is so that no one has access to it. Moreover, the cryptographic methods guarantee that this pair of keys can only be generated once, such that it is possible to assume that no two persons have randomly obtained the same pair of keys. With the public keys it is not necessary for the sender and the recipient to agree beforehand on the key to be used. All that is required is that before commencing the secret communication, the sender obtains a copy of the public key of the recipient. What is more, this same public key can be used by anyone wishing to communicate with its owner. Therefore, only n pairs of keys will be needed for every n persons who wish to communicate with each other.

And these 2 primary systems can be used to configure hybrid systems that use parts of one or the other or the two of them sequentially or in combination.

DISCLOSURE OF THE INVENTION

Technical Problem a. Encryption with secret key symmetrical algorithm puts all the security in the key and none in the algorithm. This is the reason why the size of the key is important. The DES coding algorithm uses a 56 bit key, which means there are 2 raised to the power of 56 possible keys (72,057,594,037, 927,936 keys). This constitutes a very large number of keys, but a generic computer can verify the possible combination of keys in question in a matter of days. A specialized machine can do it in hours. Encoding algorithms of more recent design such as 3DES, Blowfish and IDEA use keys of n bits, which means there are 2 raised to the power of n−1 possible keys and, in theory, it is physically impossible to verify all of them. Even so, if the user uses keys with few characters, or typical combinations of letters and numbers, these modern symmetrical encoding systems are still vulnerable by mere iteration of attempts at decoding (methods of verifying of known keys by "brute force"). Another problem is the number of keys needed. If we have a number n of persons who need to communicate, there are required n/2 keys for each pair of persons who need to communicate privately. This can work with a reduced group of persons, but it would be very hard to carry out with larger groups.

b. The major advantage of asymmetrical cryptography is that one can encode with one key and decode with another, but this system has substantial disadvantages:

A longer processing time is needed for the same length of key and message.

The keys need to be bigger than symmetrical ones.

The encoded message takes up more space than the original one.

In order to encode a message intended for a given recipient, the latter must have created and communicated his public key prior to the coding of the message.

Furthermore, they all suffer from the same problem: they do not guarantee the expiration of the messages or the number of attempts at decryption with test keys (brute force attacks).

Solution of the Problem

With this invention, Data Encryption Using an External Arguments Encryption Algorithm, hereinafter EAEA, these limitations are resolved by the use of algorithms of secret key symmetrical type, but whose functional parameters and/or the algorithm itself are unknown prior to being used, being created at the moment of the encryption and then destroyed, but stored in a computer or non-computer system (hard copy, human memory, other noncomputer data media, etc.), independent or not of the system which encrypts or decrypts the data, for subsequent reuse at the time of the decryption.

The encryption and decryption algorithm being a set of fixed instructions, the parameters will be modifiers of same.

For example, the algorithm can be to add a value "n" to each numerical value of the message and convert to upper case every group of "m" consecutive lower case letters.

And the parameters for an encryption would be to use "n"=3 and "m"=2, whereas for another encryption they might be: use "n"=31 and "m"=7, etc.

Thus, it is a Client-Server system, where the Client uses a set of variable parameters and/or its own algorithm specifically configured for each data item being encrypted, but stored externally to the Client itself, in the Server. The operating parameters and/or the encryption/decryption algorithm itself can be generated/used either by the Client or by the Server, but they are stored solely in the Server (whether or not this is a computer storage system) independently of the Client (which safeguards it from vulnerabilities due to reverse engineering techniques). This is the essential characteristic of this invention. The use of one or more passwords are only additional elements of security and obfuscation of the encrypted message/data.

Despite the existence of the Server and the communications with it, the confidentiality of the message and that of the secret key is guaranteed because these are either not communicated to the Server or not recorded in it, depending on the level of security desired.

These levels of security are as follows:

Level 0—Basic: The Encrypting Client uses a password, secret or not, but in any case it is not delivered to the Server so that it can use it as an encryption key for the parameters and/or its own encryption/decryption algorithm, which will be kept in the Server.

Level 1—Medium: The Encrypting Client uses a secret password and this is delivered to the Server so that it uses it as an encryption key of the parameters and/or its own encryption/decryption algorithm, which will be kept in the Server.

Level 2—High: The Encrypting Client uses a secret password and this is delivered to the Server so that it uses it as an encryption key of the parameters and/or its own encryption/decryption algorithm. In addition, this key will be stored in the Server directly or in combination with other data, for authentication of the Decrypting Client, at the proper time.

Level 3—Maximum: The Encrypting Client provides 2 secret passwords (or 2 halves of the same secret password). The first one will not be stored in the Server but will be used in the Server as encryption key of the parameters and/or its own encryption/decryption algorithm, which will be kept in the Server. And the second one will be stored in the Server directly or in combination with other data, for authentication of the Decrypting Client, at the proper time.

In addition to these levels of security, the encryption system can increase its security by the activation/deactivation of the following parameters, which are configurable by the users of this invention.

a.—Allow the combination of the encryption key of the Encrypting Client with a random key of the Server. This will provide a Unified EAEA Encryption key. This will be communicated to the Encrypting Client on security levels 0 and 1, and stored in the Server for security levels 2 and 3. In this way, the password used will always be of the most suitable type for symmetrical key encryption systems: many characters, seldom used, highly varied and without any meaning, in any language, and having no correlation to the human user of the Encrypting Client.

b.—Specify a date/time of expiration of the data after which the EAEA parameters stored in the Server will be erased irretrievably.

c.—Specify a maximum number of decryptions per day, month, year, range of dates, hours, or total.

d.—With security levels 2 and 3, one could specify a maximum number of wrong repetitions of the authentication password, once exceeded a certain type of action being taken (alert, erasing of the EAEA parameters stored in the Server, or only deactivate its communication with this Client or with everyone, at this time/day/month/year or forever, etc.)

e.—Since in order to access the Server, both in Encrypting client and Decrypting client mode, the Clients need to be identified/authenticated as users of the Server, this invention can:

e.1.—Limit, control and/or monitor both the Encrypting Clients and the Decrypting Clients.

e.2.—Offer usage statistics and history of activities.

e.3.—Restrict the Decrypting Clients or groups of Decrypting Clients authorized by the Encrypting Client (and those registered and authenticated in the Server at the time of requesting the EAEA parameters), and this for each of their items of data or for all of them globally.

Advantageous Effects of the Invention

This invention can guarantee the expiration of the encrypted data, regardless of the data medium or the existing copies of same. It can also be configured to guarantee the limiting of attempts at decryption of the data. It is able to identify the person attempting to decrypt the data, successfully or not, and the data and time of the attempts. Likewise, it is able to limit the number of times that decrypting will be permitted to a given user and/or to any user. It also provides the advantage of guaranteeing the encryption with secret, complex user codes which are much longer than the 8 or 12 characters customarily used for human users.

Obviously, this invention is compatible with and can be used in combination with any other existing system of encryption, adding these capabilities to any that are employed with it.

BRIEF DESCRIPTION OF THE FIGURES

Best Way to Implement the Invention

Although this Client Server system can be realized both in local environments of a single computer, and in local-area networks (LAN) and wide-area networks (WAN), the most effective and efficient way of implementing it is by the use of one or more local computers as the Client and a remote Server computer, accessible through the Internet or an intranet.

Method of Implementing the Invention

We shall explain below the ways of proceeding between a local computer as the Client and a remote Server computer on Internet.

Both in the case of encryption and decryption, we shall forgo detailing the process of connection and authentication of the Client in the Server, due to the lack of interest, to illustrative effects of the way of implementing this invention. Likewise, we shall assume that an encrypting/decrypting algorithm is not generated for each message, but instead it is always the same one, just using different parameters. We shall assume that these encryption/decryption parameters are generated by the Server and communicated by it to the Client, but the invention will work identically in the opposite instance, with the sole difference that the direction of the communication of these parameters between the Server and the Client would change. It should also be pointed out that it is assumed that it is the Client in which the encryption takes place, but this task can also be performed by the Server.

We shall now detail a typical implementation of what the cores of the Client and Server programs might be, in pseudocode.

Case of Level 0—Basic: The Encrypting Client uses a password, secret or not, but in any case it is not delivered to the Server for the latter to use it as an encryption key for the parameters and/or its own encryption/decryption program, which will be kept in the Server.

Example of Encrypting Client (in pseudocode):
READ data
REQUEST x, y, Transposition table, Identifier
FOR EACH character of the message
IF it is a digit
character=character+x
ELSE
tmp=convert (character) to its ASCII code
character=ASCII Code (tmp+y)
END IF
Character=Transpose (character, Transposition table)
END FOR EACH
SAVE Identifier, Data
Example of Server in Encrypting mode (in pseudocode):
GENERATE x, y, Transposition table
Identifier=SAVE x, y, Transposition table
COMMUNICATE x, y, Transposition table, Identifier Example of Decrypting Client (in pseudocode)
READ Identifier, Data
REQUEST Identifier (x, y, Transposition table)
FOR EACH character of the message
IF it is a digit
character=character−x
ELSE
tmp=convert (character) to its ASCII code
character=ASCII Code (tmp−y)
END IF
Character=Invert/Transpose (character, Transposition table)
END FOR EACH
SAVE Data
Example of Server in Decryption mode (in pseudocode):
RECEIVE Identifier
RETRIEVE Identifier (x, y, Transposition table)
COMMUNICATE x, y, Transposition table
The sequence of the processes and messages interchanged between Encrypting Client and Server would be:
0) Client reads the data to be encrypted.
1) Client requests parameters and Identifier from the Server.
2) Server generates the parameters.
3) Server stores the parameters, retrievable under the Identifier index.
4) Server communicates the parameters and the Identifier.
5) Client performs the encryption of the data using the parameters.
6) Client stores the data together with the Identifier.
And the sequence of the processes and messages interchanged between Decrypting Client and Server would be:
0) Client reads the encrypted data and the corresponding Identifier.
1) Client requests from the Server the parameters corresponding to the Identifier.
2) Server retrieves the parameters corresponding to the Identifier.
3) Server communicates the parameters.
5) Client performs the decryption of the data using the parameters.
6) Client stores the decrypted data.
Case of Level 1—Medium: The Encrypting Client uses a secret password and it is delivered to the Server for the latter to use it as encryption key for the parameters and/or its own encryption/decryption program, which will be kept in the Server.
Example of Encrypting Client (in pseudocode):
READ Data, Key
REQUEST Key (x, y, Transposition table, Identifier)
FOR EACH character of the message
IF it is a digit
character=character+x
ELSE
tmp=convert (character) to its ASCII code
character=ASCII Code (tmp+y)
END IF
tmp1=convert (character) to its ASCII code
tmp2=convert (next character of Key) to its ASCII code
character=ASCII Code (tmp1+tmp2)
Character=Transpose (character, Transposition table)
END FOR EACH
SAVE Identifier, Data Example of Server in Encrypting mode (in pseudocode):
RECEIVE Key
GENERATE x, y, Transposition table
tmp=CONCATENATE (x, y, Transposition table)
FOR EACH character of tmp
tmp1=convert (character) to its ASCII code
tmp2=convert (next character of Key) to its ASCII code
character=ASCII Code (tmp1+tmp2)
END FOR EACH
Identifier=SAVE (tmp)
COMMUNICATE x, y, Transposition table, Identifier
Example of Decrypting Client (in pseudocode)
READ Identifier, Data, Key
REQUEST Identifier (Key, (x, y, Transposition table))
FOR EACH character of the message
IF it is a digit
character=character−x
ELSE
tmp=convert (character) to its ASCII code
character=ASCII Code (tmp−y)
END IF
tmp1=convert (character) to its ASCII code
tmp2=convert (next character of Key) to its ASCII code
character=ASCII Code (tmp1−tmp2)
Character=Invert/Transpose (character, Transposition table)
END FOR EACH
SAVE Data
Example of Server in Decryption mode (in pseudocode):
RECEIVE Identifier, Key
RETRIEVE Identifier (tmp)
FOR EACH character of tmp
tmp1=convert (character) to its ASCII code
tmp2=convert (next character of Key) to its ASCII code
character=ASCII Code (tmp1−tmp2)
END FOR EACH
x, y, Transposition table=SEPARATE (tmp)
COMMUNICATE x, y, Transposition table
The sequence of the processes and messages interchanged between Encrypting
Client and Server would be:
0) Client reads the data to be encrypted.
1) Client Communicates Encryption Key to Server
2) Client requests parameters and Identifier from the Server.
3) Server generates the parameters.
4) Server encrypts the parameters using the key received from the Encrypting Client
5) Server stores the encrypted parameters, retrievable under the Identifier index.
6) Server communicates the parameters and the Identifier.
7) Client performs the encryption of the data using the parameters.
8) Client stores the data together with the Identifier.
And the sequence of the processes and messages interchanged between
Decrypting Client and Server would be:
0) Client reads the encrypted data and the corresponding Identifier.
1) Client requests from the Server the parameters corresponding to the Identifier and Encryption Key.
2) Server retrieves the parameters corresponding to the Identifier.
3) Server decrypts the parameters according to key received from the Decrypting Client.
4) Server communicates the parameters.

5) Client performs the decryption of the data using the parameters and the secret key.
6) Client stores the decrypted data.

Case of Level 2—High: The Encrypting Client uses a secret password and it is delivered to the Server for the latter to use it as an encryption key for the parameters and/or its own encryption/decryption program. In addition, this key will be stored in the Server directly or in combination with other data, to authenticate the Decrypting Client, at the proper time.

Example of Encrypting Client (in pseudocode):
READ Data, KeyE
REQUEST KeyE (x, y, Transposition table, Identifier)
FOR EACH character of the message
IF it is a digit
character=character+x
ELSE
tmp=convert (character) to its ASCII code
character=ASCII Code (tmp+y)
END IF
tmp1=convert (character) to its ASCII code
tmp2=convert (next character of KeyE) to its ASCII code
character=ASCII Code (tmp1+tmp2)
Character=Transpose (character, Transposition table)
END FOR EACH
SAVE Identifier, Data Example of Server in Encrypting mode (in pseudocode):
RECEIVE KeyE
GENERATE x, y, Transposition table
tmp=CONCATENATE (x, y, Transposition table, KeyE)
FOR EACH character of tmp
tmp1=convert (character) to its ASCII code
tmp2=convert (next character of KeyE) to its ASCII code
character=ASCII Code (tmp1+tmp2)
END FOR EACH
Identifier=SAVE (tmp)
COMMUNICATE x, y, Transposition table, Identifier Example of Decrypting Client (in pseudocode)
READ Identifier, Data, KeyD
REQUEST Identifier (KeyD, (x, y, Transposition table))
FOR EACH character of the message
IF it is a digit
character=character−x
ELSE
tmp=convert (character) to its ASCII code
character=ASCII Code (tmp−y)
END IF
tmp1=convert (character) to its ASCII code
tmp2=convert (next character of KeyD) to its ASCII code
character=ASCII Code (tmp1−tmp2)
Character=Invert/Transpose (character, Transposition table)
END FOR EACH
SAVE Data Example of Server in Decryption mode (in pseudocode):
RECEIVE Identifier, KeyD
RETRIEVE Identifier (tmp)
FOR EACH character of tmp
tmp1=convert (character) to its ASCII code
tmp2=convert (next character of KeyD) to its ASCII code
character=ASCII Code (tmp1−tmp2)
END FOR EACH
KeyE, x, y, Transposition table=SEPARATE (tmp)
IF KeyE=KeyD
COMMUNICATE x, y, Transposition table
END IF The sequence of the processes and messages interchanged between Encrypting Client and Server would be:
0) Client reads the data to be encrypted.
1) Client Communicates Encryption Key to Server
2) Client requests parameters and Identifier from the Server.
3) Server generates the parameters.
4) Server encrypts the parameters using the key received from the Encrypting Client
5) Server stores the encrypted parameters, retrievable under the Identifier index.
6) Server Communicates the parameters and the Identifier.
7) Client performs the encryption of the data using the parameters.
8) Client stores the data together with the Identifier.

And the sequence of the processes and messages interchanged between Decrypting Client and Server would be:
0) Client reads the encrypted data and the corresponding Identifier.
1) Client requests from the Server the parameters corresponding to the Identifier and Encryption Key.
2) Server retrieves the parameters corresponding to the Identifier.
3) Server decrypts the parameters according to key received from the Decrypting Client.
4) Server verifies that the secret Key communicated by the Encrypting Client is identical to the secret key communicated by the Decrypting Client.
5) Server Communicates the parameters.
6) Client performs the decryption of the data using the parameters and the secret key.
7) Client stores the decrypted data.

Case of Level 3—Maximum: The Encrypting Client provides 2 secret passwords (or 2 halves of the same secret password). The first one will not be stored in the Server but will be used in the Server as encryption key for the parameters and/or its own encryption/decryption algorithm, which will be kept in the Server. The second one will be stored in the Server directly or in combination with other data, to authenticate the Decrypting Client, at the proper time.

Example of Encrypting Client (in pseudocode):
READ Data, Key1, KeyE
REQUEST KeyE (x, y, Transposition table, Identifier)
FOR EACH character of the message
IF it is a digit
character=character+x
ELSE
tmp=convert (character) to its ASCII code
character=ASCII Code (tmp+y)
END IF
tmp1=convert (character) to its ASCII code
tmp2=convert (next character of Key1) to its ASCII code
character=ASCII Code (tmp1+tmp2)
Character=Transpose (character, Transposition table)
END FOR EACH
SAVE Identifier, Data Example of Server in Encrypting mode (in pseudocode):
RECEIVE KeyE
GENERATE x, y, Transposition table
tmp=CONCATENATE (x, y, Transposition table, KeyE)
FOR EACH character of tmp
tmp1=convert (character) to its ASCII code
tmp2=convert (next character of KeyE) to its ASCII code
character=ASCII Code (tmp1+tmp2)

```
END FOR EACH
Identifier=SAVE (tmp)
COMMUNICATE x, y, Transposition table, Identifier
Example of Decrypting Client (in pseudocode)
READ Identifier, Data, Key1, KeyD
REQUEST Identifier (KeyD, (x, y, Transposition table))
FOR EACH character of the message
IF it is a digit
character=character-x
ELSE
tmp=convert (character) to its ASCII code
character=ASCII Code (tmp-y)
END IF
tmp1=convert (character) to its ASCII code
tmp2=convert (next character of Key1) to its ASCII code
character=ASCII Code (tmp1+tmp2)
Character=Invert Transpose (character, Transposition table)
END FOR EACH
SAVE Data
Example of Server in Decryption mode (in pseudocode):
RECEIVE Identifier, KeyD
RETRIEVE Identifier (tmp)
FOR EACH character of tmp
tmp1=convert (character) to its ASCII code
tmp2=convert (next character of KeyD) to its ASCII code
character=ASCII Code (tmp1-tmp2)
END FOR EACH
KeyE, x, y, Transposition table=SEPARATE (tmp)
IF KeyE=KeyD
COMMUNICATE x, y, Transposition table
END IF
```

The sequence of the processes and messages interchanged between Encrypting Client and Server would be:

0) Client reads the data to be encrypted, the key1 and the keyE for the Server.
1) Client Communicates encryption KeyE to the Server
2) Client requests parameters and Identifier from the Server.
3) Server generates the parameters.
4) Server encrypts the parameters using the KeyE received from the Encrypting Client
5) Server stores the encrypted parameters, retrievable under the Identifier index.
6) Server communicates the parameters and the Identifier.
7) Client performs the encryption of the data using the parameters and the Key1.
8) Client stores the data together with the Identifier.

And the sequence of the processes and messages interchanged between Decrypting Client and Server would be:

0) Client reads the encrypted data and the corresponding Identifier.
1) Client requests from the Server the parameters corresponding to the Identifier and decryption KeyD.
2) Server retrieves the parameters corresponding to the Identifier.
3) Server decrypts the parameters according to KeyD received from the Decrypting Client.
4) Server verifies that the secret key (KeyE) communicated by the Encrypting Client is identical to the secret key (KeyD) communicated by the Decrypting Client.
5) Server Communicates the parameters.
6) Client performs the decryption of the data using the parameters and the secret key (Key1).
7) Client stores the decrypted data.

INDUSTRIAL APPLICABILITY

The most obvious industrial implementation is the operation of a server (or networks of servers) providing worldwide service to users registering in it or identified through their access to an existing social network having a service gateway with said servers.

Free Text of List of Sequences

The invention claimed is:

1. A computer-implemented method of decrypting an original encrypted data item from a client encryption system using a client decryption system, the method comprising:
receiving from the client encryption system, by the client decryption system, both the original encrypted data item and an identifier of External Arguments Encryption Algorithm (EAEA) parameters configured for the original encrypted data item;
logging into an EAEA server wherein the EAEA parameters of encryption or decryption configured for at least the original encrypted data item are stored but wherein the original encrypted data item is not stored at the EAEA server;
obtaining, by the client decryption system, computer-executable decryption instructions; and
executing, by the client decryption system, the computer-executable decryption instructions using the EAEA parameters from the EAEA server upon the original encrypted data item so that the original encrypted data item becomes a decrypted version of the original encrypted data item without keeping the EAEA parameters so that the EAEA parameters reside solely at the EAEA server and so that any copies of the original encrypted data item are thereby made invulnerable to any brute force decryption attempt.

2. The computer-implemented method of claim 1 wherein all encryption of the original encrypted data item was performed by using the EAEA parameters in lieu of using any password and wherein all decryption of the original encrypted data item is performed by using the EAEA parameters in lieu of using any password.

3. The computer-implemented method of claim 1, wherein the logging into the EAEA server wherein the EAEA parameters configured for at least the original encrypted data item are stored comprises:
obtaining from the client encryption system, by the client decryption system, a secret password; and
receiving, by the client decryption system, an indication that the EAEA server has authenticated the client decryption system after transmitting the secret password obtained from the client encryption system to the EAEA server.

4. The computer-implemented method of claim 1, wherein the obtaining computer-executable decryption instructions comprises:
receiving from the EAEA server, by the client decryption system, the computer-executable decryption instructions.

5. The computer-implemented method of claim 1, wherein the executing the computer-executable decryption instructions using the EAEA parameters received from the EAEA server upon the original encrypted data item so that the original encrypted data item becomes the decrypted version of the original encrypted data item comprises:
sending, by the client decryption system, a request to the EAEA server that includes the identifier of the EAEA parameters, wherein the EAEA parameters are indexed at the EAEA server by the identifier of the EAEA parameters;

receiving the EAEA parameters, by the client decryption system, from the EAEA server after sending the request to the EAEA server; and executing the computer-executable decryption instructions using the EAEA parameters from the EAEA server upon the original encrypted data item so that the original encrypted data item becomes the decrypted version of the original encrypted data item without keeping the EAEA parameters received at the client decryption system so that the EAEA parameters reside solely at the EAEA server and so that any copies of the original encrypted data item are thereby made invulnerable to any brute force decryption attempt.

6. A computer-implemented method of operating a client encryption system, the method comprising:

obtaining, by the client encryption system, access into an External Arguments Encryption Algorithm (EAEA) server;

establishing EAEA parameters usable by computer-executable encryption instructions upon a data item so that the data item becomes an encrypted data item without keeping the EAEA parameters at the client encryption system so that the EAEA parameters reside solely at the EAEA server and so that any copies of the encrypted data item are thereby made invulnerable to any brute force decryption attempt; and transmitting, by the client encryption system, an identifier of the EAEA parameters so that a recipient of the encrypted data item can decrypt the encrypted data item only after sending the identifier to the EAEA server and receiving the EAEA parameters from the EAEA server, wherein the EAEA parameters are indexed at the EAEA server by the identifier of the EAEA parameters.

7. The computer-implemented method of claim 6, further comprising:

executing, by the client encryption system, the computer-executable encryption instructions using the EAEA parameters upon the data item so that the data item becomes the encrypted data item without the client encryption system keeping the EAEA parameters so that the EAEA parameters reside solely at the EAEA server and so that any copies of the encrypted data item are thereby made invulnerable to any brute force decryption attempt.

8. The computer-implemented method of claim 6, wherein the establishing the EAEA parameters usable by the computer-executable encryption instructions upon the data item without keeping the EAEA parameters at the client encryption system so that the EAEA parameters reside solely at the EAEA server and so that any copies of the encrypted data item are thereby made invulnerable to any brute force decryption attempt comprises:

requesting, by the client encryption system, the EAEA parameters usable by the computer-executable encryption instructions upon the data item;

receiving, by the client encryption system, the EAEA parameters and the identifier of the EAEA parameters, wherein the EAEA parameters are indexed at the EAEA server by the identifier of the EAEA parameters;

executing, by the client encryption system, the computer-executable encryption instructions upon the data item using the EAEA parameters without keeping the EAEA parameters at the client encryption system so that the data item becomes an encrypted data item and so that the EAEA parameters reside solely at the EAEA server; and transmitting to the recipient, by the client encryption system, the identifier of the EAEA parameters with the encrypted data item so that the recipient can decrypt the encrypted data item only after the recipient logs into the EAEA server and receives the EAEA parameters from the EAEA server.

9. The computer-implemented method of claim 8, wherein the establishing the EAEA parameters usable by the computer-executable encryption instructions upon the data item without keeping the EAEA parameters at the client encryption system so that the EAEA parameters reside solely at the EAEA server and so that any copies of the encrypted data item are thereby made invulnerable to any brute force decryption attempt further comprises:

receiving, by the client encryption system, the computer-executable encryption instructions from the EAEA server.

10. The computer-implemented method of claim 6, wherein the establishing the EAEA parameters usable by the computer-executable encryption instructions upon the data item without keeping the EAEA parameters at the client encryption system so that the EAEA parameters reside solely at the EAEA server and so that any copies of the encrypted data item are thereby made invulnerable to any brute force decryption attempt further comprises:

transmitting to the EAEA server, by the client encryption system, a version number of the computer-executable encryption instructions.

11. The computer-implemented method of claim 6, wherein the transmitting the identifier of the EAEA parameters so that the recipient of the encrypted data item can decrypt the encrypted data item only after sending the identifier to the EAEA server and receiving the EAEA parameters from the EAEA server comprises:

transmitting to the recipient, by the client encryption system, the identifier of the EAEA parameters with the encrypted data item so that the recipient can decrypt the encrypted data item only after the recipient logs into the EAEA server and receives the EAEA parameters from the EAEA server.

12. The computer-implemented method of claim 6, wherein the transmitting the identifier of the EAEA parameters so that a recipient of the encrypted data item can decrypt the encrypted data item only after sending the identifier to the EAEA server and receiving the EAEA parameters from the EAEA server comprises:

transmitting to the EAEA server, by the client encryption system, a scheduled data expiration date on which the EAEA parameters are scheduled to expire after which no subsequent decryption of the encrypted data item will be possible.

13. The computer-implemented method of claim 6, wherein the transmitting the identifier of the EAEA parameters so that a recipient of the encrypted data item can decrypt the encrypted data item only after sending the identifier to the EAEA server and receiving the EAEA parameters from the EAEA server comprises:

transmitting to the EAEA server, by the client encryption system, a limitation of how many times the EAEA server may transmit the EAEA parameters beyond which no additional decryption of the encrypted data item will be possible.

14. The computer-implemented method of claim 6, wherein the transmitting the identifier of the EAEA parameters so that a recipient of the encrypted data item can decrypt the encrypted data item only after sending the identifier to the EAEA server and receiving the EAEA parameters from the EAEA server comprises:

transmitting to the EAEA server, by the client encryption system, an identifier of a given user and a limitation of how many times that given user may receive the EAEA parameters from the EAEA server.

15. The computer-implemented method of claim 6, wherein the transmitting the identifier of the EAEA parameters so that a recipient of the encrypted data item can decrypt the encrypted data item only after sending the identifier to the EAEA server and receiving the EAEA parameters from the EAEA server comprises:

transmitting to the recipient of the encrypted data item, by the client encryption system, a secret password by which the EAEA server can authenticate the recipient of the encrypted data item.

16. A computer-implemented method of operating an External Arguments Encryption Algorithm (EAEA) server, the method comprising:

authenticating, by the EAEA server, a client encryption system so that the client encryption system becomes an authenticated client encryption system;

receiving from the authenticated client encryption system, by the EAEA server, a request for EAEA parameters usable by computer-executable encryption instructions executable at the authenticated client encryption system;

transmitting to the authenticated client encryption system, by the EAEA server, both the EAEA parameters and an identifier of the EAEA parameters;

storing the EAEA parameters, by the EAEA server, wherein the EAEA parameters are indexed by the identifier of the EAEA parameters, even after the authenticated client encryption system executes the computer-executable encryption instructions upon a data item so that the data item becomes an encrypted data item and even after the EAEA parameters reside solely at the EAEA server and so that any copies of the encrypted data item are thereby made invulnerable to any brute force decryption attempt;

authenticating, by the EAEA server, a client decryption system that received the identifier of the EAEA parameters with the encrypted data item so that the client decryption system becomes an authenticated client decryption system;

receiving from the authenticated client decryption system, by the EAEA server, a request for the EAEA parameters that includes the identifier of the EAEA parameters, wherein the EAEA parameters are usable by computer-executable decryption instructions executable at the authenticated client decryption system; and transmitting to the authenticated client decryption system, by the EAEA server, the EAEA parameters indexed by the identifier so that the authenticated client decryption system becomes able to decrypt the encrypted data item by executing the computer-executable decryption instructions using the EAEA parameters requested and received from the EAEA server.

17. The computer-implemented method of claim 16, wherein the transmitting to the authenticated client decryption system the EAEA parameters indexed by the identifier so that the authenticated client decryption system becomes able to decrypt the encrypted data item by executing the computer-executable decryption instructions using the EAEA parameters requested and received from the EAEA server comprises:

receiving from the client encryption system, by the EAEA server, a scheduled data expiration date on which the EAEA parameters are scheduled to expire; and transmitting to the authenticated client decryption system, before the scheduled data expiration date and by the EAEA server, the EAEA parameters indexed by the identifier so that the authenticated client decryption system becomes able to decrypt the encrypted data item by executing the computer-executable decryption instructions using the EAEA parameters requested and received from the EAEA server for a limited time; and implementing the scheduled data expiration date so that no subsequent decryption of the encrypted data item will be possible.

18. The computer-implemented method of claim 16, further comprising:

aggregating, by the EAEA server, usage data concerning both the request for the EAEA parameters usable by the computer-executable encryption instructions executable at the authenticated client encryption system and the request for the EAEA parameters usable by the computer-executable decryption instructions executable at the authenticated client decryption system.

19. The computer-implemented method of claim 16, further comprising:

receiving, by the EAEA server, a list of decrypting clients authorized to the receive the EAEA parameters usable by the computer-executable decryption instructions by the client encryption system; and restricting access to the EAEA parameters usable by the computer-executable decryption instructions, by the EAEA server, by determining that the list of decrypting clients authorized by the client encryption system to receive the EAEA parameters includes the client decryption system before transmitting the EAEA parameters to the client decryption system.

20. The computer-implemented method of claim 16, wherein the authenticating the client decryption system that received the identifier of the EAEA parameters with the encrypted data item comprises:

receiving from the client encryption system, by the EAEA server, a secret password;

receiving, by the EAEA server, a password from the client decryption system; and authenticating the client decryption system by confirming that the password from the client decryption system is the secret password received from the client encryption system, the client decryption system having received the secret password from the client encryption system.

21. The computer-implemented method of claim 16, wherein the transmitting to the authenticated client encryption system, by the EAEA server, both the EAEA parameters and the identifier of the EAEA parameters comprises:

receiving, by the EAEA server, a secret password from the authenticated client encryption system before the EAEA parameters and the identifier of the EAEA parameters are transmitted to the authenticated client encryption system;

encrypting, by the EAEA server, the EAEA parameters using the secret password received from the authenticated client encryption system as an encryption key so that the EAEA parameters become encrypted EAEA parameters; and replacing the EAEA parameters stored on the EAEA server with the encrypted EAEA parameters without keeping the secret password received from the authenticated client encryption system stored on the EAEA server.

22. The computer-implemented method of claim 16, wherein the transmitting to the authenticated client decryption system the EAEA parameters indexed by the identifier comprises:

receiving, by the EAEA server, a secret password from the authenticated client decryption system;

decrypting, by the EAEA server, the EAEA parameters stored on the EAEA server using the secret password from the authenticated client decryption system as a decryption key so that the EAEA parameters become decrypted EAEA parameters; and transmitting to the authenticated client decryption system, by the EAEA server, the decrypted EAEA parameters without keeping the secret password from the authenticated client decryption system stored on the EAEA server and without keeping the decrypted EAEA parameters stored on the EAEA server.

23. The computer-implemented method of claim 16, further comprising:

receiving from the authenticated client encryption system, by the EAEA server, a limitation of how many times the EAEA server may transmit the EAEA parameters beyond which no additional client-implemented decryption of the encrypted data item will be possible.

* * * * *